United States Patent Office 3,129,208
Patented Apr. 14, 1964

3,129,208
PROCESS FOR THE POLYMERIZATION OF ALPHA OLEFINS IN THE PRESENCE OF AN ALUMINUM SESQUIHALIDE, TITANIUM HALIDE, A LOWER ALKYLENE OXIDE AND HYDROGEN
James L. Jezl, Swarthmore, Habet M. Khelghatian, Springfield, and Louise D. Hague, Villanova, Pa., assignors to Sun Oil Company, Philadelphia, Pa., a corporation of New Jersey
No Drawing. Filed Nov. 3, 1960, Ser. No. 66,935
6 Claims. (Cl. 260—93.7)

This invention relates to a novel process for the polymerization of olefins, and more particularly to a method for the polymerization of alpha olefins having no branching in the 2-position in the presence of a catalyst consisting essentially of an aluminum sesquihalide, an essentially amorphous titanium trichloride, and an epoxy compound, and in the presence of hydrogen.

It is known that alpha olefins may be polymerized in the presence of a catalyst comprising a transition metal chloride such as titanium trichloride, and an alumnium alkyl such as aluminum triethyl or aluminium diethyl chloride to form solid crystalline polymers having utility in the fabrication of shaped articles, films, and fibers. These aluminum alkyls are expensive, but heretofore it has not been found feasible to use the aluminum sesquihalides, which are readily and inexpensively prepared by reaction of halogenated hydrocarbons with aluminum powder, as catalyst components, since as pointed out in U.S. Patent 2,951,066, the combination of aluminum sesquihalides and transition metal chlorides will not polymerize olifins to crystalline solid polymers.

In our copending application S.N. 65,916, and now abandoned, filed October 31, 1960, it is disclosed that catalyst systems comprising an essentially amorphous titanium trichloride and aluminum sesquihalides may be complexed with an epoxide such as ethylene oxide, propylene oxide, butylene oxide, or amylene oxide to yield catalyst systems having activities approaching or exceeding that of catalyst systems employing the more expensive aluminum dialkyl halides.

The essentially amorphous titanium trichloride useful in the practice of the invention may be prepared by reaction of titanium tetrachloride with hydrogen or metallic aluminum or titanium to yield a titanium trichloride which exhibits a crystalline structure under X-rays. The crystalline form of titanium trichloride is then physically treated, as by ball milling or rod milling until substantially all of its crystallinity has been destroyed. By this we mean that the X-ray diffraction intensity has been reduced to 100% or less than that observed with the untreated titanium trichloride. Unlike crystalline titanium trichloride. amorphous titanium trichloride, when complexed with an aluminum sesquichloride will polymerize alpha olefins to solid crystalline polymers, but the rate of polymerization with this catalyst system is so slow that the use of this catalyst system is commercially impracticable.

Aluminum sesquihalides useful as catalyst components have the formula $AlR_{1.5}X_{1.5}$, where R is an alkyl, aralkyl, or aryl radical having from 2 to 12 carbon atoms, preferably ethyl, propyl, butyl, or isobutyl. Examples of useful sesquihalides are aluminum ethyl sesquichloride, aluminum ethyl sesquibromide, aluminum propyl sesquichloride, and aluminum phenyl sesquichloride. The mol ratio of aluminum sesquihalide to metal chloride should be in the range of 1:5 to 10:1, and preferably from about 1.5:1 to 3:1. The mol ratio of aluminum sequihalide to the epoxide should be from 10:1 to about 5:4. Lower ratios should not be used since at 1:1 ratio the rate of polymerization is very low, and at lower ratios no polymerization takes place.

Reaction conditions for the polymerization include temperatures of from 0° C. to 250° C., preferably about 70–80° C., and pressures from atmospheric to about 500 p.s.i.g. Olefins which can be polymerized with the novel catalyst system include all alpha olefins having from 2 to about 20 carbon atoms, and which do not have branching at the 2-position. Examples of such olefins are ethylene, propylene, butene-1, and 4-methyl-pentene-1. In the case of the normally gaseous olefins, it is preferred to conduct the reaction in the presence of an inert liquid reaction medium, preferably a hydrocarbon such as heptane, hexane, isooctane, benzene, or toluene. When the olefin to be polymerized is normally liquid under the polymerization conditions employed, the reaction medium may be dispensed with, but it is preferred to use a reaction medium even with normally liquid olefins, in order to recover the reaction product as an easily handled slurry.

We have now discovered that, when using an epoxide as the complexing agent, the reaction rate may be substantially increased if the reaction is conducted in the presence at least 5 parts per million, based on the weight of liquid in the reactor, of hydrogen. Furthermore, over about 5 p.p.m. $H_2$ does not appear to appreciably affect the rate of polymerization. However, for practical purposes, the hydrogen should be limited to about 250 p.p.m., since quantities above this amount yield a polymer having an undesirably low molecular weight.

In order that those skilled in the art may more fully appreciate the nature of our invention and the manner of carrying it out, the following examples are given. In all examples the titanium trichloride used was essentially amorphous.

*Example I*

A reactor is charged with heptane, and aluminum ethyl sesquichloride and titanium trichloride, in a mol ratio of 2:1, is added in an amount such that the concentration of titanium trichloride in the heptane is 0.035 gram per 100 cc. The reactor is then sealed, the contents brought to a temperature of 160° F., and is pressured to 140 p.s.i.g. with propylene. The reactor is maintained at this temperature, with stirring, for a period of 240 minutes. At the end of this time the reaction product is treated with methanol to deactivate the catalyst, the reactor is opened, and the contents are removed. Solid crystalline polypropylene is recovered from the reaction mixture in an amount indicating that the rate of polymerization is 0.05 pound of polymer per hour per gallon of heptane. The polymer is 89.9% insoluble in boiling pentane.

*Example II*

A reactor is charged with heptane, and aluminum ethyl sesquichloride, titanium trichloride, and propylene oxide is added in a mol ratio of 2:1:1 in an amount such that the concentration of titanium trichloride in the heptane is 0.035 gram per liter. The reactor then sealed, the temperature is brought to 160° F., and the reactor is pressured with propylene to 140 p.s.i.g. The temperature and pressure are maintained, while stirring the reactor contents, for a period of 57 minutes, after which the reaction mixture is treated with methanol to deactivate the catalyst, the reactor is opened, and the contents removed. Solid crystalline polypropylene, 85.5 percent insoluble in boiling pentane, is recovered from the reaction mixture in an amount indicating that the rate of polymerization is 0.57 pound of polymer per hour per gallon of heptane. This rate is commercially acceptable.

*Example III*

The procedure of Example II is followed except that the polymerization is carried out in the presence of 22 parts per million of hydrogen, based on the weight of the heptane. The rate of polymerization is 0.86 pound of polymer per hour per gallon of heptane.

*Example IV*

The procedure of Example II is followed, substituting 1,2 butylene oxide for the propylene oxide used in Example II. Propylene was polymerized at the rate of 0.35 pound per hour per gallon of heptane.

*Examples V–IX*

The procedure of Example IV is followed, except that the polymerization is carried out in the presence of 8 p.p.m., 22 p.p.m., 22 p.p.m. (check run), 55 p.p.m., and 88 p.p.m., respectively, by weight of hydrogen based on the weight of heptane. Rates of polymerization are 0.51, 0.53, 0.54, 0.55, and 0.54 pound of polymer per gallon of heptane per hour, respectively.

*Example X*

The procedure of Example IV is followed, substituting aluminum ethyl sesquibromide for aluminum ethyl sesquichloride, and conducting the polymerization in the presence of 22 p.p.m. by weight of hydrogen, based on the weight of the heptane. The rate of polymerization is 0.48 pound of polymer per hour per gallon of heptane.

When other epoxides such as ethylene oxide or amylene oxide are substituted for butylene oxide or propylene oxide, similar increased reaction rates are obtained in the presence of hydrogen, as compared with runs made in the absence of hydrogen.

The invention claimed is:

1. In a process for the polymerization of alpha olefins which comprises contacting a solution, in an inert hydrocarbon solvent, of an alpha olefin having from 2 to 20 carbon atoms free from branching at the 2-position with a catalytic composition consisting essentially of an aluminum sesquihalide selected from the group consisting of sesquichlorides and sesquibromides, an essentially amorphous titanium trichloride, and a lower alkylene oxide; wherein the mol ratio of aluminum sesquihalide to titanium trichloride is from 1:5 to 10:1 and the mol ratio of aluminum sesquihalide to lower alkylene oxide is from 10:1 to 5:4, the improvement which consists in conducting the polymerization in the presence of at least 5 parts by million by weight, based on the weight of the solvent, of hydrogen.

2. The process according to claim 1 in which the sesquihalide is aluminum ethyl sesquichloride.

3. The process according to claim 1 in which the epoxy compound is butylene oxide.

4. The process according to claim 1 in which the epoxy compound is propylene oxide.

5. The process according to claim 2 in which the epoxy compound is ethylene oxide.

6. The process according to claim 2 in which the epoxy compound is propylene oxide.

References Cited in the file of this patent

UNITED STATES PATENTS

| | | |
|---|---|---|
| 2,974,132 | Jacobi | Mar. 7, 1961 |
| 3,001,976 | Langer et al. | Sept. 26, 1961 |

FOREIGN PATENTS

| | | |
|---|---|---|
| 551,905 | Belgium | Apr. 18, 1957 |
| 807,204 | Great Britain | Jan. 7, 1959 |